United States Patent
Robert et al.

(10) Patent No.: US 11,077,968 B2
(45) Date of Patent: Aug. 3, 2021

(54) METHOD AND FACILITY FOR FILLING TRAVELING EGG TRAYS

(71) Applicant: Zoetis Services LLC, Parsippany, NJ (US)

(72) Inventors: Pierre Robert, Cholet (FR); Franck Robert, Cholet (FR)

(73) Assignee: Zoetis Services LLC, Parsippany, NJ (US)

( * ) Notice: Subject to any disclaimer, the term of this patent is extended or adjusted under 35 U.S.C. 154(b) by 0 days.

(21) Appl. No.: 16/686,307

(22) Filed: Nov. 18, 2019

(65) Prior Publication Data
US 2020/0079541 A1     Mar. 12, 2020

Related U.S. Application Data

(63) Continuation of application No. 15/289,321, filed on Oct. 10, 2016, now Pat. No. 10,518,915, which is a
(Continued)

(30) Foreign Application Priority Data

Apr. 24, 2014 (FR) ..................................... 14/00971

(51) Int. Cl.
*B65B 23/08*     (2006.01)
*A01K 43/00*     (2006.01)

(52) U.S. Cl.
CPC ............... *B65B 23/08* (2013.01); *A01K 43/00* (2013.01)

(58) Field of Classification Search
CPC ........ A01K 43/00; A01K 43/04; B65B 23/08; B65G 49/05; G01N 33/08; G01N 33/085
(Continued)

(56) References Cited

U.S. PATENT DOCUMENTS 5,898,488 A    4/1999   Kuhl
8,696,297 B2    4/2014   Mogenet et al.
(Continued)

FOREIGN PATENT DOCUMENTS

EP     2377393 A1    10/2011
FR     2912600 A1    8/2008
(Continued)

OTHER PUBLICATIONS

EP Extended Search Report, dated Aug. 31, 2018, EP Application No. EP18173686.

*Primary Examiner* — Saul Rodriguez
*Assistant Examiner* — Brendan P Tighe
(74) *Attorney, Agent, or Firm* — Scott C. Mayhew (57) ABSTRACT

The invention relates to a so-called stabilization method, consisting of completing the filling of traveling egg trays. In each of the successive trays, eggs taken from an available egg reservoir are deposited in empty locations. This reservoir is made up of egg receiving cells that are movable along rows of cells in series. Depending on a filling state of the tray being treated identifying the distribution of the empty locations relative to the full locations, the reservoir is automatically configured in a configuration of egg-bearing cells complementary to said filling state of the tray in progress, so as to next transfer eggs between the reservoir and the tray in progress by correspondence between empty locations and full locations in the tray and the presence or absence of an egg-bearing cell in the reservoir.

5 Claims, 5 Drawing Sheets

Related U.S. Application Data continuation of application No. PCT/IB2015/000577, filed on Apr. 24, 2015.

(58) Field of Classification Search
USPC ........ 356/52, 53, 54, 55, 56, 57, 58, 59, 60, 356/61, 62, 63, 64, 65, 66; 414/752.1
See application file for complete search history.

(56) References Cited

U.S. PATENT DOCUMENTS

| | | | |
|---|---|---|---|
| 2005/0030521 A1* | 2/2005 | Phelps | G01N 33/08 356/53 |
| 2010/0221093 A1* | 9/2010 | Mogenet | A01K 43/00 414/589 |

FOREIGN PATENT DOCUMENTS

| | | |
|---|---|---|
| FR | 2972896 B1 | 3/2014 |
| JP | 2000 128124 | 5/2000 |
| JP | 2000128124 A * | 5/2000 |

* cited by examiner

METHOD AND FACILITY FOR FILLING TRAVELING EGG TRAYS

This application is a continuation of U.S. patent application Ser. No. 15/289,321, filed Oct. 10, 2016, which is a continuation of International Application No. PCT/IB2015/000577, filed Apr. 24, 2015, which claims the benefit of French Patent Application No. 14/00971, filed Apr. 24, 2014, all of which are expressly incorporated herein by reference in their entirety.

The present invention relates to a method and facility for filling successive egg trays on a line of traveling egg trays. Its essential features more particularly relate to the operation that people in the trade call "stabilization", which consists of completing the filling rate of the trays by identifying which egg-receiving locations are devoid of an egg in the tray in progress (also called current tray) and depositing eggs therein that are taken from an available egg reserve. This reserve is situated outside the travel line of the trays successively subjected to the stabilization operations. It may be formed from eggs present in a determined tray of the chain that has been selected upstream from the stabilization unit of the facility and that is intended to be emptied of its eggs for this purpose.

It will be noted that, at this stage, the treated eggs are not identified other than as discrete objects that are distributed in trays conveying them. It is only when the preferred application conditions for implementing the invention are considered that the notion of eggs takes on a more specific meaning, designating fragile objects which, like chicken eggs, must be handled with care, and stored correctly in a stable position in the trays holding them. It is further known that chicken eggs are treated in a chain in very large numbers and at a very fast pace, which may justify using elaborate means that would not be profitable in other applications.

The invention more particularly, but non-limitingly, examines applications in which the stabilization operations occur, in a more complete industrial method, after a prior step for checking the condition of the individual eggs leading to the removal from each tray of eggs deemed not valid and unsuitable for the subsequent intended use of the eggs deemed valid remaining in each tray. In particular, egg candling machines are used to detect, by visiometry, whether each of the eggs present in the tray during each treatment cycle of the successive traveling trays is fertilized and to remove unfertilized eggs from the process, which are considered invalid for subsequent treatment because, for example, there is no point in sending them to destinations intended for fertilized eggs, such as hatchers where the chicks will be born. Other compliance verifications may pertain to the outer geometric shape of the eggs.

This demonstrates the interest in performing a stabilization step making it possible to complete the filling rate of the trays before sending them to their subsequent intended use. A high degree of completion of the trays is particularly desirable when the fertilized eggs are intended to be used in facilities where they receive a product such as a vaccine administered to them by injection. This may involve either vaccinating the eggs or using individual eggs as a culture medium for vaccine growth. It is important for the trays entering the egg processing machine to be full, while containing only valid eggs so as to avoid a dose of vaccine being wasted or misused, inasmuch as the injection is performed indifferently in each egg receiving location of the tray, therefore even in empty locations.

The state of the art in this area is in particular illustrated by patent documents FR 2,912,600, U.S. Pat. No. 5,898,488 and EP 2,377,393. The need for stabilization operations to perfect the filling of the tray upon each treatment cycle of the successive trays of the treatment line is known in itself; the present invention therefore specifically examines how valid eggs are taken from a reserve of eggs available for that purpose and how they are transferred to refill the current tray in its locations with no eggs.

It provides for automating these operations by acting not on the control of individual transfer tools specific to each egg for transfers between the reserve of available eggs in which it is withdrawn and an empty location of the current tray in which it is deposited, but rather on the control of the mechanical elements of a specially designed reservoir of available eggs. It thereby makes it possible to ensure that the locations receiving eggs in the various trays are filled correctly, in particular in accordance with determined specifications regarding the filling rate of each tray, effectively and reliably, without losing time in the handling rhythm of the trays on the line. It also leads to ensuring such "stabilization," while avoiding the use of equipment that would be complex, expensive, difficult to install or problematic to maintain.

In preferred embodiments of the invention, the latter relates to a facility for filling successive traveling trays in which a reservoir of available eggs for filling empty egg locations in a tray being stabilized is made up of cells, each receiving eggs that are individually movable under the control of a control device that automatically controls the movement to bring them into a reservoir configuration, which itself is established automatically based on the filling rate of the current tray identifying the distribution of empty locations relative to filled locations. The placements of cells bearing eggs in said reservoir configuration prior to the removal of the eggs that they contain may advantageously be done row by row in a reservoir where the cells are arranged in parallel rows and where, in each row, they are mounted sliding one after the other along a guide rail guiding their movement.

According to one particularly interesting feature of the invention, it is possible to provide, in the method, for periodically supplying the reservoir with valid eggs from all of the eggs of one of the traveling trays, selected to that end upstream from the stabilization unit. One thus ensures that the reservoir has enough eggs to correctly complete the successive trays in the traveling circuit and performs this filling by using one of the trays, which is completely emptied before removing it from the treatment line. According to one advantageous feature of the invention, the method may further include a step for redistributing available eggs in the reservoir by removing a determined number of eggs from the cells of a row of the reservoir that it has been automatically determined is more stocked and to deposit the eggs thus withdrawn in the cells of a row of the reservoir that it has been automatically determined is less stocked.

The means for transferring eggs between the main treatment line of the successive trays and the reservoir can in particular consist of a suction plate, i.e., a plate including individual gripping means for the eggs that are distributed in as many lines and columns as each of the successive traveling trays has locations or cells for receiving an egg.

The movement and distribution of the cells in the reservoir can advantageously be done using a comb with retractable teeth positioned along a driving line across the rows of cells. Such a comb will be described below as including a support arm with retractable teeth that is mounted, movable in the direction defined by the rows of cells in the reservoir, and that is provided with fingers making up the retractable teeth, each movable between a deployed position where it is active in driving a cell of the reservoir with which it is cooperating, and a retracted position in which it is made inactive, in particular by the fact that it withdraws from all of the cells across from which it passes when the comb travels over the assembly in a to-and-fro movement from one end of the reservoir to the other.

According to one particular embodiment of such a reservoir with moving cells, each cell is in the form of a basin hollowed in a housing that has flat and parallel side walls each able to abut on either side of the basin in which an egg is positioned, with a counterpart face of an adjacent cell housing. The cells are thus alongside one another, abutting against one another in each row. Furthermore, each cell housing has a driving tab with which the teeth of the comb can engage by placing itself either in front of or behind it, the choice being controlled automatically depending on the movement direction of the comb so that the driven cell pushes the other cells of the same row with it.

According to other features of the invention, the rows of cells receiving available eggs include a number of cells greater than the number of egg receiving locations in each line of a tray. The reservoir can thus include a cell storage zone serving to reload the reservoir when it is periodically supplied with new eggs, this storage zone being separate from a loading zone, or transfer zone, in which the presented eggs available after movement of the cells in the desired configuration will be removed for transfer to the tray undergoing treatment at the stabilization unit and deposited in the empty locations of this tray.

The invention will be more completely described in the context of preferred features and advantages, described here in one of its possible applications, with eggs, in reference to FIGS. 1 to 9, in which:

and FIGS. 4 to 9 are illustrations of the steps of the method according to the invention, with:

Figure 1:
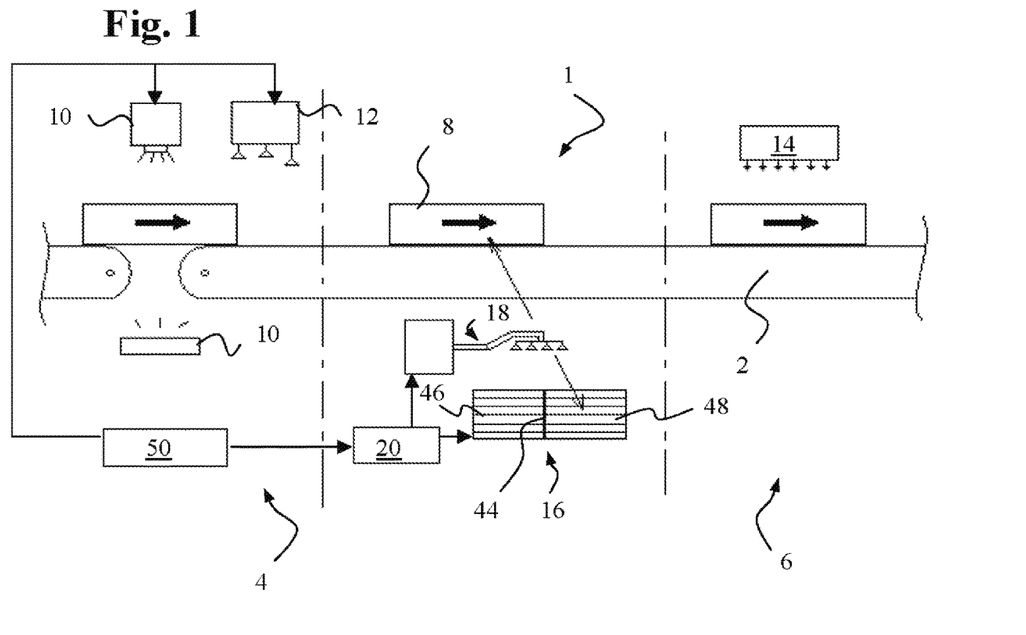
FIG. 1 is a diagrammatic illustration of the stabilization facility, here positioned between a visiometry candling unit, at the outlet of which the non-valid eggs are removed, and a unit for injecting vaccines into the eggs present in the trays.

In a facility according to the invention like that illustrated as an example in FIG. 1, the stabilization unit 1 is positioned on the path of a conveyor 2, between a prior treatment unit for the eggs illustrated by a candling unit 4 and a subsequent treatment unit of the eggs illustrated by a vaccine injection unit 6. The egg trays 8 are driven by the conveyor to travel, one after the next, from the candling unit to the inlet of the stabilization unit and from the outlet thereof toward the injection unit. The candling unit here includes means 10 for examining by visiometry and grasping means 12 to remove any eggs deemed non-valid from the tray having passed in front of the examining means. The processing unit includes injection means 14 able to penetrate each egg individually, for example inoculation needles for a vaccine seed culture present in a number and arrangement corresponding to that of the locations of eggs in a tray, the assembly being supported by a remote-controlled ramp.

We will provide a more detailed description of the stabilization unit, specific to the invention, in that it includes a reservoir 16 for refill eggs, which is positioned in parallel with the conveyor and in which it is provided to make valid eggs available to be used to fill each of the trays successively allowed in the stabilization unit, as well as a transfer plate 18, able to transfer eggs between the reservoir and the trays traveling along the conveyor line, and a control unit 20, here said to use software means because it controls the transfer plate in the egg removal, movement and egg release operations, under the automatic control of software means made up of computer programs managing the various operations to control the plate movement based on information relative to the filling of the trays traveling on the conveyor.

The conveyor is traditional and for example consists of a conveyor belt for transporting trays, the belt successively serving the different units of the facility. Here, we are interested in the part of the conveyor forming a travel pathway between the candling unit and the treatment unit through the stabilization unit for the treatment of each tray in progress in the sequence of trays traveling through the stabilization unit.

Trays 8 are positioned on the conveyor and travel from one unit to the next, advantageously with the same frequency established between each passage. The trays have egg locations 22, each hollowed out in a basin to receive an egg, different locations being positioned in a checkerboard pattern of orthogonal rows and lines, with Xc lines of Yc locations. In each tray in progress allowed into the stabilization unit, certain locations are empty, in particular following candling operations in which non-valid eggs have been identified and removed from the tray. The distribution of locations detected as being empty and locations that are full where an egg is present is recorded in the form of a filling rate that is specific to each tray and different from the filling state of the preceding tray and that of the following tray.

The reservoir 16 is situated parallel with the conveyor, i.e., it is not positioned in line on the conveying circuit, but laterally outside that circuit, in a position appropriate for transferring eggs from the reservoir to a tray of the treatment line, or vice versa. The reservoir includes movable cells 24 that are each made in the form of a cell housing in the form of a slab with planar side walls hollowed out by a basin receiving an egg and with which a control device is associated, automatically controlling drive means 26 moving the different cells.

The reservoir is made up of Xr row of Yr cells, and the number of rows of the reservoir is defined as a number at least equal to the number of lines of the tray, and the number of cells per row as a number at least equal to, but preferably greater than, the number of locations per line. In the illustrated case, a number Xc of lines is advantageously chosen equal to the number Xr of rows, so as to easily make the nth line of the tray correspond to the nth row of the reservoir. Here, this number is arbitrarily equal to ten. Furthermore, in the illustrated cases, it is chosen to have a reservoir made up of approximately 33% more cells than there are egg locations in a tray, such that one for example has twenty cells per row in the reservoir for only fifteen locations per line in each tray.

Figure 2:
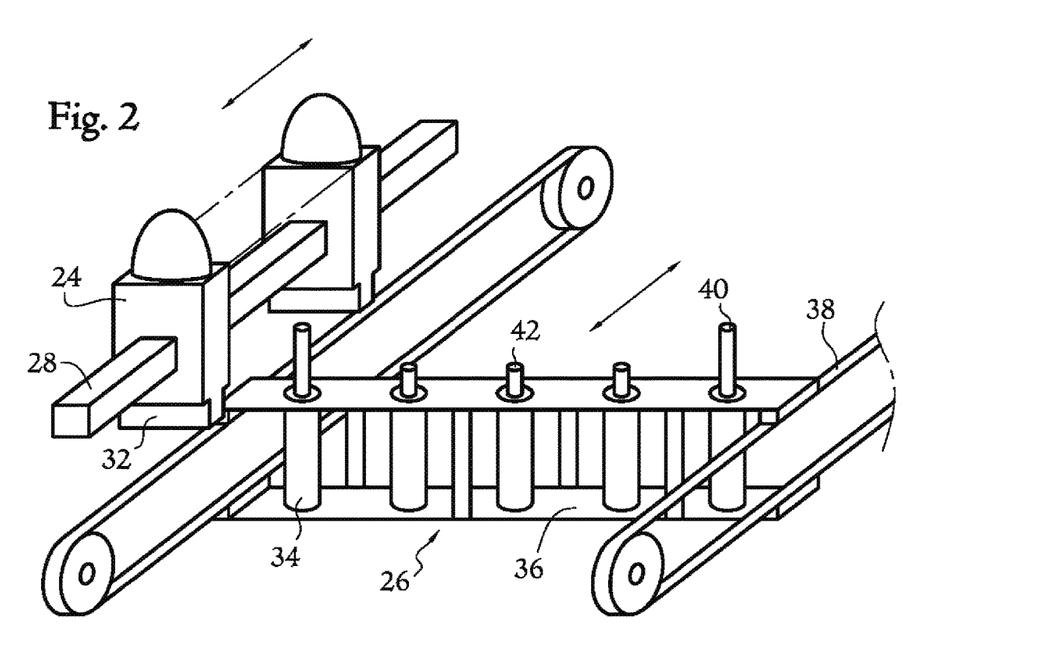
FIG. 2 is a detailed view of the reservoir of the facility illustrated in FIG. 1, partially showing two cells of a same row and the associated drive means, these means being illustrated with fingers in the deployed driving position and fingers in the retracted inactive driving position.

As illustrated in FIG. 2, the cells are supported by guide rails 28 guiding their travel, on which they slide under the effect of drive means controlled by the control unit. Each row of cells in the reservoir has a corresponding guide rail on which the Yr cells of the row are mounted in series. Below the housing of each cell 24, a tab 32 is provided protruding vertically from the housing, perpendicular to the axis of the guide rail. This tab can extend over the entire width of the cell housing, but in the preferred embodiment of the invention described here as an example, it has above all been provided that the cell housing here has a decrease in section in the longitudinal direction, forming one shoulder at the rear and another at the front, such that, when the cells are pressed in series against one another in the row, a recess is formed between the cells to allow a driving finger to be inserted between them.

Driving means 26 for the cells of the different rows extend below the assembly of these cells. They include a jack device 34 for each row of cells, all of these devices being supported by a supporting arm 36 that extends across the guide rails 28. This support arm here is supported at its lateral ends by two belt drive means 38, such that the arm can move longitudinally below the rows of cells. The drive means are motorized and controlled automatically so as to move in a to-and-fro translational movement, from one end of the various rows of cells to the other.

The arm 36 therefore supports a plurality of jack devices, the actuation of which is controlled by the software means of the control device associated with the stabilization unit. When the jack device is actuated in the deployment direction, the rod of the jack 40 is deployed until it assumes a deployed position in which the free end of the rod, hereinafter called finger 42, extends at the height of the lower end of the cells. The movement of the arm when a jack device is thus deployed generates the contact of the corresponding finger with a cell, or more accurately with the driving tab that protrudes from the electrode housing.

It will thus be understood that when the drive means move below the cells, the fingers of the jack devices do not touch the cells when the jack devices are in the retracted position, and that if a jack device is in the deployed position (shown in FIG. 2 for the jack device associated with the row in which the cells have been shown), the corresponding finger pushes the cell against which it is in contact. As long as the finger remains in contact with the cell, the drive means push that cell, as well as all of the cells situated downstream in that row, which will therefore also move along the rail, while the upstream cells do not move.

When the jack device associated with a row is retracted, the finger is no longer across the protruding tabs of the cells of that row and no longer performs the driving function of those cells. The latter stop and keep the place they are in when the jack device is removed. It will be understood that the cells are connected to the guide rail by a sliding connection determined such that the cells can slide on their corresponding rail when they are pushed by the drive means, but they can also stop as soon as the jack device retracts and the corresponding finger ceases to push them. It will, for example, be possible to provide specific materials that have a friction coefficient allowing such a mechanical retaining effect.

As illustrated in FIGS. 6 to 9, it is possible to distinguish two distinct zones of the reservoir, separated by a line of demarcation 44 that extends virtually across the rows of the reservoir. A first zone consists of a storage zone 46, in which the cells are pushed and concentrated against one another, and a second zone consists of a loading zone 48, or transfer zone, in which the eggs made available therein are withdrawn to be transferred into the tray in progress in the stabilization unit, and in which the cells are arranged, row by row, not necessarily alongside and abutting against one another, so as to form a negative mirror image of the tray allowed into the filling unit on the conveyor, as will be described below. The reservoir is sized such that each of these zones can extend lengthwise over a distance equivalent to that of the Yc locations of the tray.

In the travel direction of the tray, the transfer zone and the storage zone are positioned on one side or the other of the line of demarcation and the drive means and transfer means are calibrated based on this arrangement of the zones, with the understanding that it is appropriate for the transfer plate to grasp the eggs in the transfer zone. In the illustrated examples, where the trays travel from left to right, the transfer zone is positioned to the right of the line of demarcation.

The egg transfer plate grasps all of the eggs presented to it, without any selectivity, whether in the transfer zone of the reservoir or in a determined tray of the treatment line. It consists of a plate carrying tools for gripping the eggs, equal in number to the number of receiving locations for eggs in each tray, and arranged identically to the arrangement of the egg receiving locations of the tray, here in a checkerboard pattern. Here, the gripping tools consist of suction cups, all connected at the same time either to a vacuum pump that is actuated grasp the eggs, or alternatively to a compressed air intake circuit in the suction cups to release the eggs and deposit them in their next location. These gripping means are known in themselves and will not be described in more detail here. It will, however, be emphasized that this type of suction plate has the interest, in the context of the implementation of the present invention, of traditionally being made in a form incorporating control means for the suction cups that act individually on each suction cup for opening or closing of the gripping function. In this case, the invention provides for managing the control of the suction cups from configuration information of the reservoir as it is developed based on the configuration of the tray in progress to be filled, taking into account the availability of the eggs present in the reservoir upon each tray filling cycle.

The transfer plate is associated with automatic control software means 20, which determine the direction in which the transfer of the eggs must be done, i.e., whether it involves grasping eggs from the tray undergoing treatment to deposit them in the storage zone of the reservoir (the tray thus emptied then being diverted from the main conveyance line), or if the opposite must be done, transferring eggs made available in the transfer zone from the reservoir to the tray in progress for unloading in the empty locations thereof. To that end, the control means receive information regarding the composition of the traveling tray and the number of eggs available in each row of the reservoir, and deduce control instructions therefrom for the arm and the drive means for the arrangement of the transfer zone of the reservoir, before both the filling of the tray and the supply of the reservoir.

The control software means 20, specific to the filling unit, are connected to data acquisition means for acquiring data relative to the filling of each of the trays successively allowed and/or software means 50 specific to the candling unit, and they are further connected to the mechanical components of the filling unit to control their operation, i.e., the transfer plate 18 and the drive means of the reservoir 26.

Figure 3:
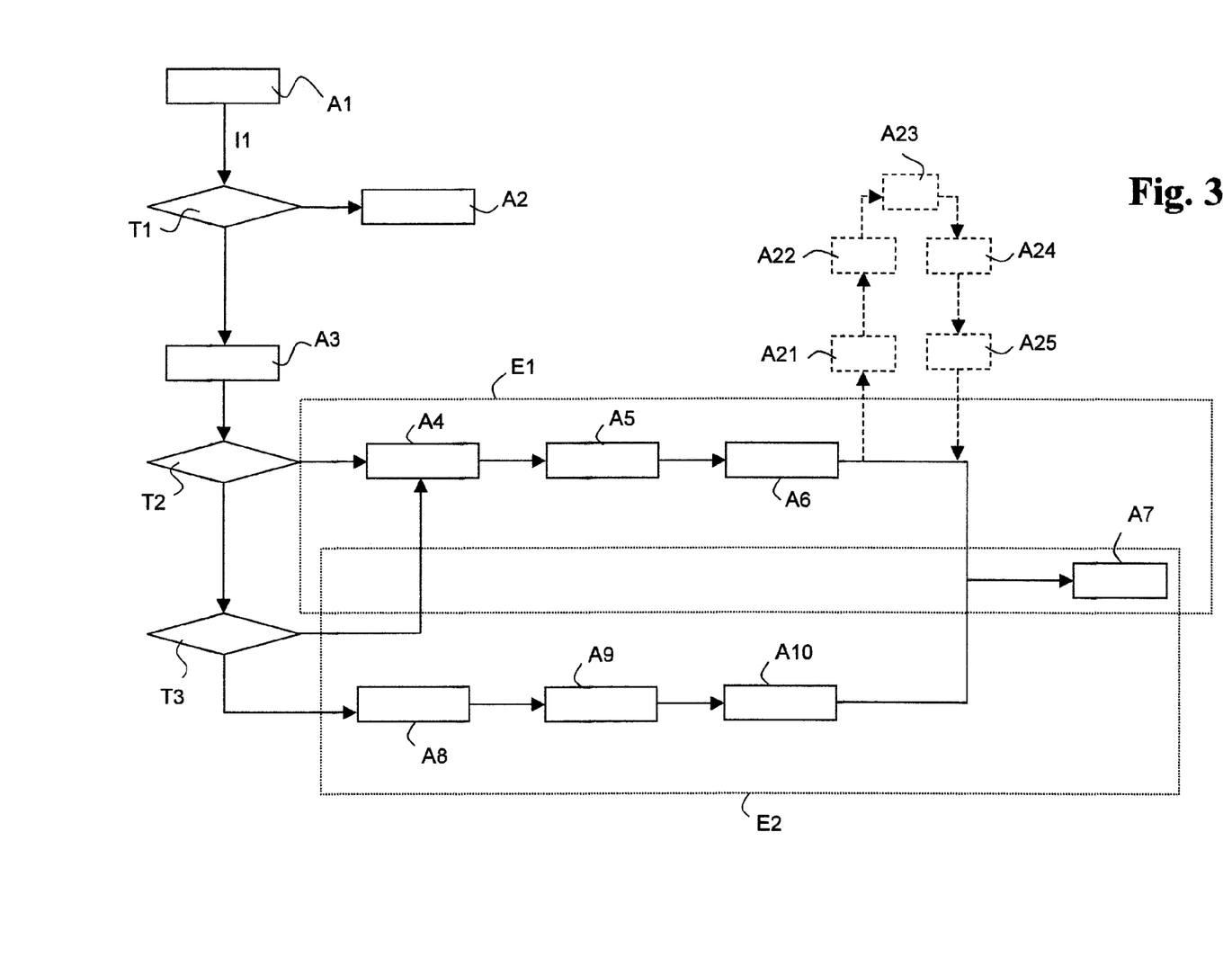
FIG. 3 is a diagram illustrating the sequence of steps of the stabilization method according to the invention, showing, in dotted lines, the steps of the method when the facility is equipped with additional transfer means, in a second embodiment of the facility.

We will now provide a functional description of the invention, based on the diagram of FIG. 3 and the illustration of the different steps in FIGS. 4 to 9, reviewing the method steps according to which the tray or reservoir is filled, based on the number of eggs present in the current tray and the number of eggs present in the reservoir, each time making a line of receiving locations of the tray in progress correspond to a row of cells in the reservoir. As illustrated in FIGS. 4 to 9, line C1 of the tray is filled or emptied relative to the number of eggs present in row R1 of the reservoir and the nth line Cn is filled or emptied relative to the number of eggs present in the nth row Rn of the reservoir.

As illustrated by the diagram in FIG. 3, the software means of the control unit automatically calculate the number of eggs to be withdrawn from the reservoir to fill each tray, as well as the configuration in which the cells bearing these eggs should be arranged so that the transfer means can correctly deposit the eggs in each empty location of the tray. Furthermore, they automatically determine whether there is cause, between two filling cycles of the current tray, to periodically resupply with eggs from the reservoir by supplying its empty cells from a traveling tray arriving at the stabilization unit from which the eggs it contains are removed. It is automatically decided, from the control unit, whether it is timely to perform such a resupply and which tray to select for emptying to that end, in particular taking into account the configuration of the reservoir in cells bearing an egg and the filling state of the soon-to-be current tray in full locations.

When a tray arrives at the stabilization unit (action A1), upon leaving the candling machine that precedes it in the travel direction of the trays on the conveyor, information I1 relative to the content of this tray, i.e., its configuration in terms of the presence or absence of eggs in each of the locations, is sent to the control device from software means specific to the candling machine by which non-valid eggs are removed from the tray depending on the result of the candling. This information, sent to the automatic control module associated with the facility, could also come from photoelectric cell sensors specific to the facility and able to detect the information on the filling state of the tray.

A first test T1 is performed by the software means based on this information. If the tray is empty, nothing is done (action A2) and the tray is discharged at the outlet of the filling unit, such that it does not move on to the vaccine injection unit. If the tray is not empty, the software means calculate (action A3) the number of eggs per line to be completed to obtain a filling level of the tray corresponding to the specifications. A second test T2 is then done based on this calculation and based on information belonging to the software means relative to the number of eggs present per row in the reservoir. If the reservoir includes enough eggs per row to complete the corresponding lines of the tray in progress, respecting a previously determined completeness threshold, a step E1 is performed for filling the trays strictly speaking.

In this step E1, the software means analyze the arrangement of the tray based on the configuration information of the content initially received (action A4), and deduce a control instruction from this for the drive means, such that the latter arrange (action A5) the row of the reservoir so that the cells bearing eggs present in the transfer zone of the reservoir form a complementary image of the distribution of the eggs present in the current tray, i.e., an opposite image in which each empty location of the tray corresponds to a full cell of the reservoir, and vice versa.

Figure 4:
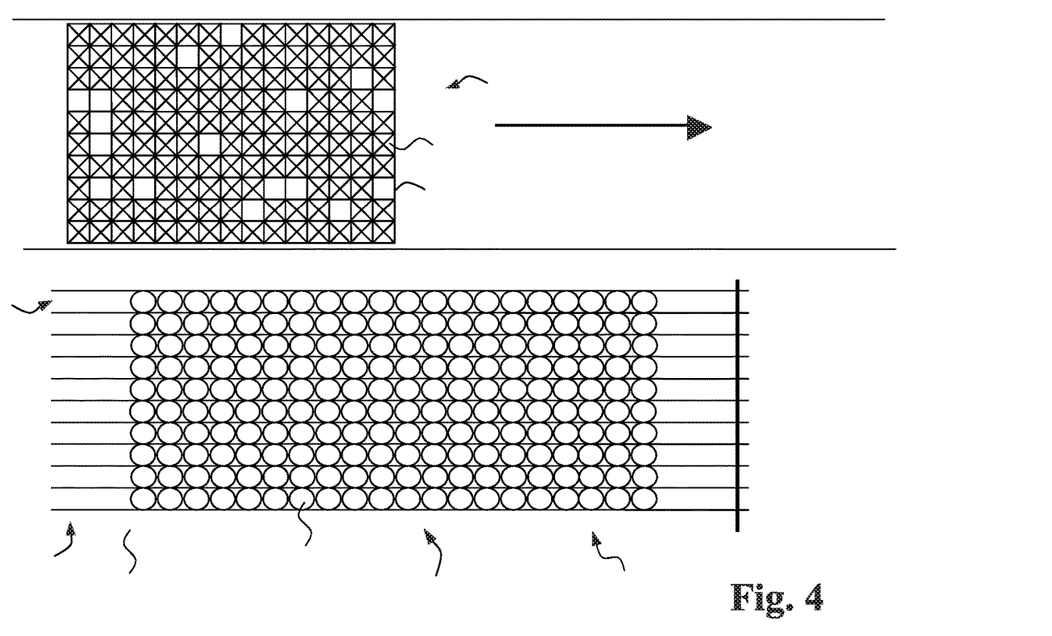
FIGS. 4 and 5 illustrating the initial supply of the reservoir.
Figure 5:
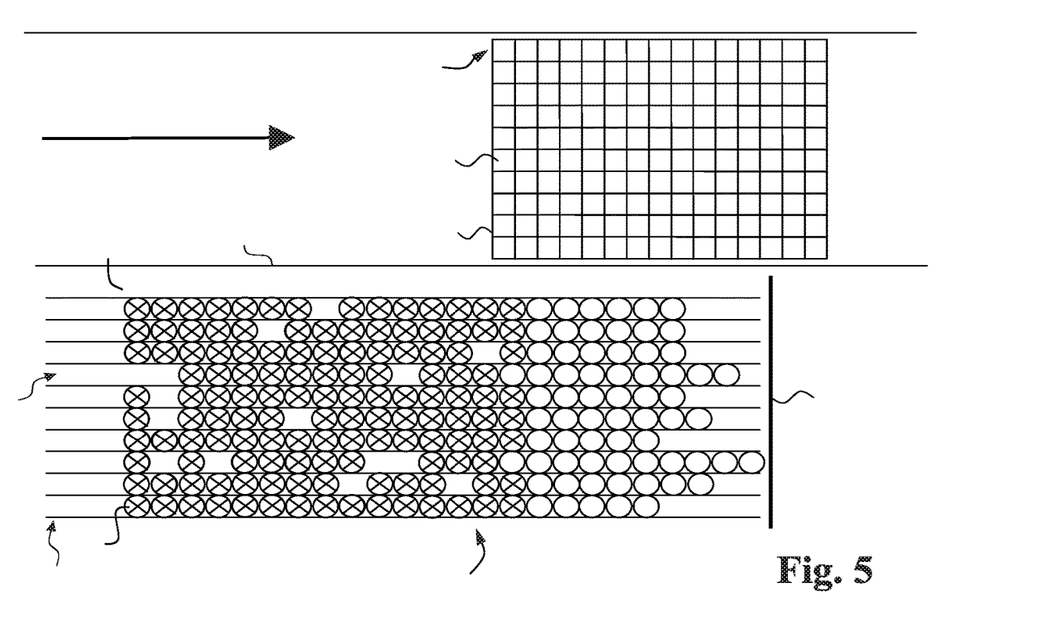

As an example, see the case illustrated in FIGS. 4 and 5, in which the tray in progress has several empty locations, including a first location positioned in the first line and seventh column, a second location positioned in the second line and fourth column, and a third location positioned in the second line and eighth column. The transfer zone of the reservoir is then arranged by the drive means under the control of the software means such that a first cell bearing an egg is positioned in the first row of the reservoir, at a distance from the line of demarcation equivalent to the bulk of seven locations, a second cell bearing an egg is positioned in the second row of the reservoir, at a distance from the line of demarcation equivalent to the bulk of seven locations, and a third cell bearing an egg is positioned in the second row of the reservoir, at a distance from the line of demarcation equivalent to the bulk of eight locations. It may further be observed that the drive means do not move cells in the third row and leave them all in the storage zone, since the tray in progress does not have an empty location in its third line.

Thus, the reservoir is configured based on the arrangement of the eggs in the tray in progress. Below, we will provide a more detailed description of how the drive means and their control by the software means that make it possible to perform this configuration step of the reservoir relative to the shape of the tray of which filling is completed.

The transfer plate then grasps and transfers (action A6) all of the eggs positioned in the transfer zone of the reservoir to the tray. The arrangement of the eggs when they are grasped in the transfer zone is retained during the transfer, such that each grasped egg is deposited in an empty location of the tray in progress, the arrangement of the eggs in the transfer zone before being grasped by the transfer plate being a negative mirror image of the image of the tray, causing a cell bearing an egg to correspond to an empty location of the tray.

Figure 6:
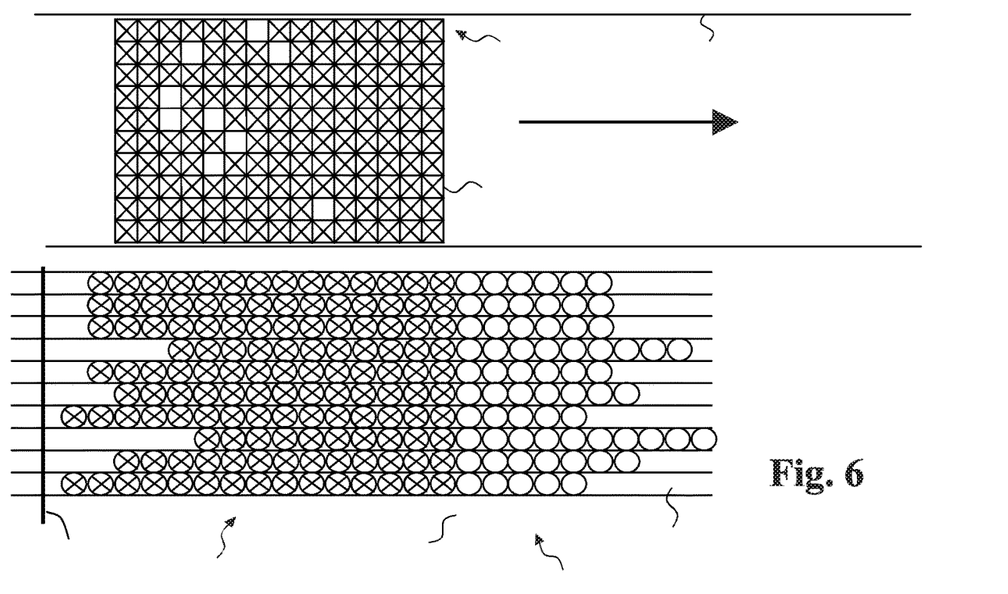
FIGS. 6 and 7 illustrating one traditional case of filling of a tray with eggs from the reservoir, and FIGS. 8 and 9 illustrating the conditions for resupplying the reservoir, FIG. 8 corresponding to a case where the reservoir is not resupplied, while FIG. 9 conversely illustrates a case where the reservoir will be supplied.
Figure 8:
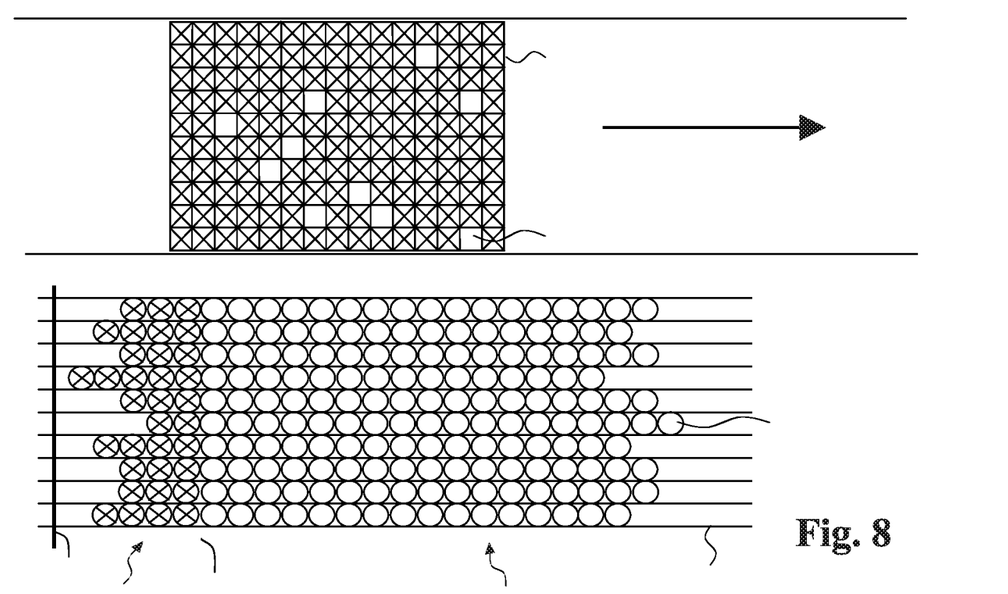
Figure 9:
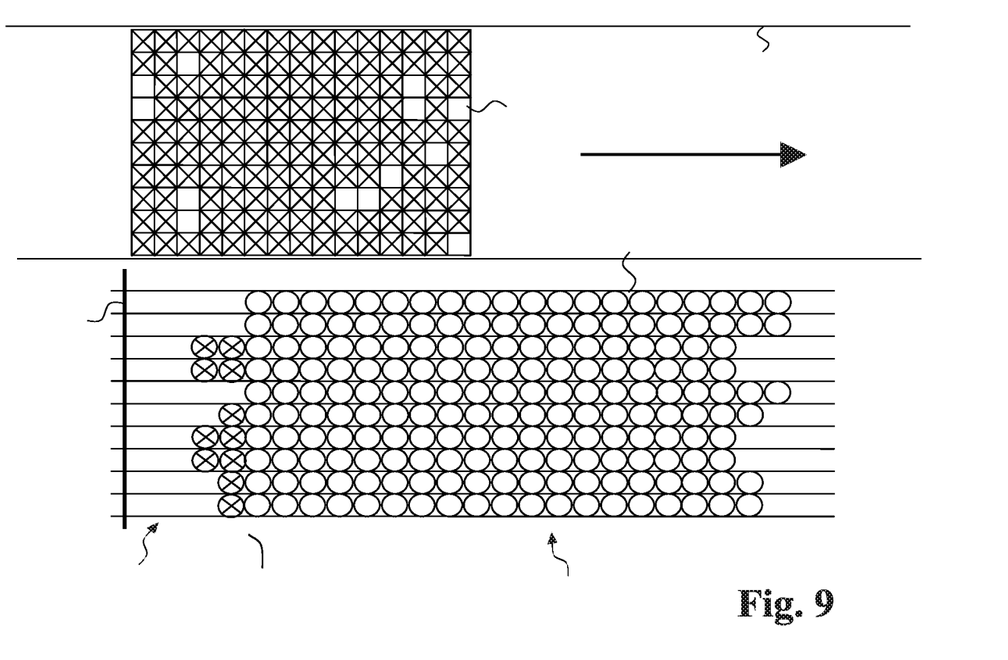

After the transfer, the drive means associated with the reservoir are controlled by the software means (action A7) so that the cells bearing eggs are pushed against one another, by row, in the storage zone, the cells in each row being more or less pushed such that the rows have an alignment on the line of demarcation between the storage zone and the transfer zone (shown in FIGS. 6, 8 and 9).

Inasmuch as the result of the second test T2 indicates that the reservoir does not include enough eggs per row to complete the corresponding lines of the tray in progress while respecting said completion threshold, a third test T3 is carried out to determine whether the reservoir has enough empty cells, row by row, to receive all of the eggs present in the tray in progress. If the result is positive, i.e., the reservoir has enough empty cells, row by row, to receive all of the eggs present in the tray, a step E2 is carried out for supplying the reservoir, as will be described below.

Such a case is illustrated in FIG. 9, which shows a tray bearing 15 eggs in the first line and 12 eggs in the eighth line, and a reservoir with twenty empty cells in the first row and eighteen empty cells in the eighth row, each row of the reservoir having at least as many empty cells as there are eggs present in the corresponding line of the tray in progress. Conversely, if the result of the test T3 is negative, step E1 is carried out again for filling the tray as previously described, allowing a downgraded operation of the filling in which the completeness threshold is not reached. Such a case of a negative test result is illustrated in FIG. 8, which shows a tray bearing 14 eggs in the first line and 15 eggs in the fourth line, and a reservoir with sixteen empty cells in the first row and fourteen empty cells in the fourth row. The fact that this fourth row of the reservoir has fewer empty cells than there are eggs present in the corresponding line of the tray in progress prevents the total transfer of the eggs from the tray to the reservoir and makes the supply step impossible.

It will be understood that the arrangement of the steps and tests as illustrated in FIG. 3 seeks to favor optimal filling of the trays by the reservoir and not to accept downgraded filling, i.e., with more trays left empty after filling than desired by the user, except when a periodic supply step of the reservoir cannot take place. Thus, the tray filling steps follow one another, upon each treatment cycle of a tray in progress, as long as the reservoir does not have enough empty cells to receive all of the eggs of the following current tray. When this is the case, a supply step E2 for supplying the reservoir interrupts the series of tray filling steps.

The reservoir supply step E2 is as follows. The software means calculate the position of the cells to be given row by row for receiving all of the eggs from the current tray (Action A8). For proper operation of the reservoir in the filling operations for future trays, no cell of a row, after the reservoir is supplied by the eggs from a tray, should be left empty upstream from a cell bearing an egg. The software means then carry out a control instruction (Action A9) to space apart certain cells in a row, as shown in FIG. 4, such that this space left empty between two cells corresponds to a location of the tray in progress that does not contain an egg.

As can be seen upon examining FIG. 5, the arrangement of the eggs grasped in the tray in progress by the transfer plate (action A10) is retained upon deposition in the reservoir, and the drive means associated with the reservoir are then implemented so that the cells alongside are pushed against one another, by row, in the storage zone, so as not to leave a space in the storage zone with no egg between two cells carrying an egg.

We will now outline the configuration operations of the reservoir relative to the shape of the tray in progress. This configuration takes place, as can be seen upon reading the preceding description, both before filling of a tray and before supplying the reservoir with all of the eggs from a tray. In this detailed description, we refer to the case illustrated in FIG. 7, in which the reservoir is configured so that the transfer zone forms a negative image of the tray being processed shown in FIGS. 6 and 7.

In this case, the software means have determined how each of the rows of the tray should be filled, i.e., here for the first three lines, by one egg in the seventh location of the first line, one egg in the fourth location of the second line, and one egg in the eighth location of the second line.

The drive means will push the cells of the reservoir, row by row, to configure the transfer zone as a negative of this image of the tray to be filled. The drive means, controlled by the software means, will in particular place an egg in the first row at a distance from the line of demarcation equivalent to seven egg locations of a tray, one egg in the second row at a distance from the line of demarcation equivalent to four egg locations of a tray, one egg in the second row at a distance from the line of demarcation equivalent to eight egg locations of a tray, and no egg in the third row.

Figure 7:
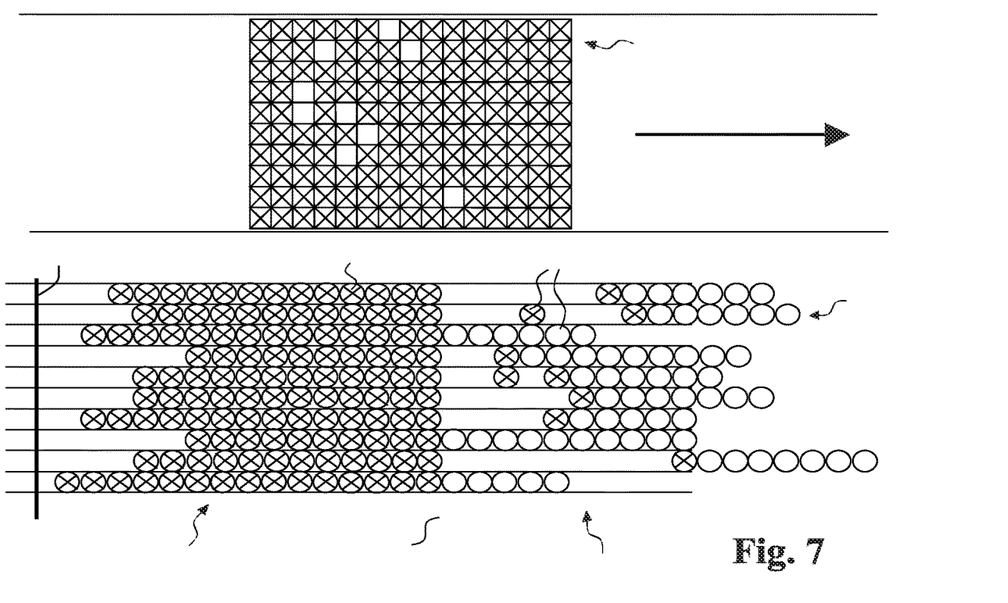

The support arm of the retractable fingers (comb) is moved axially along the rows between a first end position, past the storage zone, as illustrated in FIG. 6, and a second position, past the transfer zone, as illustrated in FIG. 7. The jack devices are actuated independently of one another depending on the arrangement given to each row with which they are associated.

In the illustrated case, the jack devices associated with the first and second row (teeth of the comb) are immediately actuated to push their row of cells, since eggs are to be withdrawn from these rows, while the jack device associated with third row is not actuated, since no egg must be withdrawn from this row.

The role of the drive means is to move the cells from the storage zone toward the transfer zone row by row, one relative to the adjacent cell, either by leaving one or more locations free or by gripping the cells against one another.

The drive means perform a first driving action which consists, for each row, of advancing the set of eggs by a distance corresponding to the number of eggs to be taken from that row, and placing these eggs in the loading zone (also called transfer zone), causing them to pass the virtual line of demarcation. In the described example, one egg must be taken from the first row, such that the jack device is actuated engaged with this cell for the movement time of the drive means over a distance corresponding to the longitudinal bulk of a cell. All of the cells are pushed in series under the effect of the action of the finger against the cell present at the head of the series, furthest from the line of demarcation, such that the cell at the tail of the row, closest to the line of demarcation, passes it, the corresponding egg being found in the transfer zone. The jack device is then controlled so that the finger assumes a retracted position, such that the cells in this row are no longer pushed and retain their position. The jack device passes below the cells, supported by the support arm. It will be understood that at the same time, the jack device associated with the third row is not actuated, since no egg must ultimately be removed from this third row, and that the jack device associated with the second row has been actuated to push all of the cells over a distance corresponding to the longitudinal bulk of two cells, since two eggs must ultimately be taken from this second row. Here again, the jack device associated with the second row is controlled so that the finger assumes a retracted position and can pass below the cells.

A second driving action is performed, once the support arm (comb) passes the virtual line of demarcation. The second driving action must make it possible to arrange, correctly in the transfer zone, the eggs pushed outside the storage zone during the first driving action. The jack devices are actuated according to the arrangement to be given to their associated row. The software means of the control device determine the distance at which the full cells must be placed from the line of demarcation to form the mirror image desired for the transfer zone. They thus determine successive targets where the cells will be placed in a same row. The finger is placed in the deployed position to push the cell(s) to be placed in this row, and the finger is left in this deployed position until the cell against which it pushes is placed at the first determined target, closest to the line of demarcation. To place the cell, the software means cause the finger of the jack device to withdraw, then, when the support arm has advanced over a cell length, the finger is again steered into the deployed position and once again begins to push the cells until the cell that it pushes directly is placed at the following target.

In the example previously described, the jack device associated with the second row is actuated from the line of demarcation so that the two cells selected to pass this line are pushed over a length equivalent to four cells, such that the cell driven directly by the finger of the jack device, i.e., the tail cell closest to the line of demarcation before the second driving action, becomes positioned on the first target corresponding to the previously determined position of an egg in the second row at a distance from the line of demarcation equivalent to four egg locations of a tray. The finger is then retracted while the support arm continues to advance below the cells, and it is deployed just after having passed the cell that one wishes to leave in place, so as to come into contact with the second cell, to be placed further on the second target.

In this way, the comb with retractable teeth formed by the set of support arms and the control jack devices of their respective fingers are steered wisely, so as to place each cell in the correct position in anticipation of being grasped by the transfer plate. It will be understood that these movements of the drive means are done whether one wishes to place empty cells correctly to receive the eggs from a tray in a step for supplying the reservoir, or to place full cells to complete the successive egg trays.

After the transfer operation, the comb having completed its travel goes to the end of the reservoir, taking with it all of the unnecessary cells found in each row of cells in series, before the last cell to have been left in place in the transfer zone strictly speaking (that on which the transfer plate operates), the retractable fingers are again actuated, but this time to engage with the cell at the head of the series in each row. The support arm is commanded to engage its movement in the return direction of its to-and-fro movement, and the fingers abut behind the driving tabs of the first cells encountered in the different rows, which are all driven toward the other end of the reservoir, in front of a driving line then embodied by the comb. The drive means again cross the reservoir from one of its ends to the other, except that the jack devices are actuated continuously to push and arrange the cells against one another, empty or full depending on the preceding operation. If a tray filling operation has preceded this, the transfer zone includes cells left empty, and the drive means push them against the full cells having remained in the storage zone, while ensuring (by commanding the withdrawal of the fingers of the jack devices at the correct moment) that the full cells are left in a configuration where each row has a full cell at the boundary of the virtual line of demarcation, as illustrated in FIG. 6 for example. If a resupply operation of the reservoir has preceded this, the drive means push the cells until they are found in the same configuration of FIG. 6 where each row has a full cell at the boundary of the virtual line of demarcation.

A second embodiment can be described, in reference to FIG. 3 and the elements of the flowchart added in dotted lines. It differs from the first embodiment primarily in that a second egg transfer means is provided, called "local", in addition to the first transfer means formed by the transfer plate previously described. The local transfer means has a field of action centered only on the reservoir, while the transfer plate moves from the reservoir to the tray and vice versa. More particularly, an egg transfer arm inside the reservoir is used upon each filling cycle, i.e., after each removal of refill eggs by the transfer plate, to equalize the number of egg-bearing cells available in each row by removing a determined number of eggs from a particularly well stocked row to position them in a less stocked row.

In this way, a solution is offered to the problem that may arise when the reservoir empties only in some rows, while the others remain fairly full. This may in particular occur when, even though on average the non-valid eggs are distributed evenly over all of the lines of the tray, a series of trays containing few or no non-valid eggs in a specific line follow one another in the filling unit. Yet as the machine is designed, the reservoir is filled by a tray in progress when all of the rows of the reservoir can be supplied at the same time.

It therefore suffices for a row of the reservoir not to have enough empty cells for this supply to be impossible, and for only one row of cells to continue to provide eggs to replace spots left empty in the corresponding line of the tray. During this time, the other, empty rows of the tray no longer make it possible to complete the trays 100%.

The local transfer arm receives an instruction from software means associated with the filling unit, which automatically determines the number of cells bearing an egg in each row of the reservoir, and therefore the identification of the row of cells containing the most eggs (action A21). Based on this data, the software means indicate the row of cells in which the transfer arm must grasp the eggs and the number of eggs it must grasp (action A22). At the same time, the software means identify the row of cells containing the fewest eggs (action A23). They then send a control instruction to the drive means so that they arrange (action A24) that row to correctly have a sufficient number of empty cells to receive these eggs. The software means lastly inform the transfer arm of the row of cells in which these eggs must be deposited (action A25).

As an example, in each cycle, the local transfer arm can recover three eggs from the fullest row of the reservoir and deposit them in the emptiest row. It will be understood the choice of three eggs is purely arbitrary, and that it could be different after each cycle, the transfer arm then being arranged such that it may indifferently grasp one or more eggs according to the instructions from the software means.

The change of the number of eggs in two rows of the reservoir that results from this action by the second transfer means is followed by a command from the drive means to adjust, if necessary, the position of the full cells and the empty cells of these two rows, relative to the virtual line of demarcation between the transfer zone and the storage zone, as this position sought after each filling cycle has previously been described.

The preceding description clearly explains how the invention makes it possible to achieve its objectives. In particular, it allows the implementation of egg stabilization operations that are particularly effective to lead to an optimal filling rate of the successive current trays.

In the case of the first embodiment, i.e., that where only the main transfer plate is provided (the plate that withdraws the prepared eggs from the cells of the reservoir and deposits them in the tray in progress), without adding the local transfer arm, it will be within the reach of the skilled in the art to best determine the additional quantity of cells to be provided. Increasing the number of cells in the reservoir relative to the number of eggs in the trays makes it possible to improve the final filling rate, but with a side effect of increasing the average time spent by the eggs in the reservoir, and therefore outside incubators.

In an alternative embodiment of the invention not specifically illustrated in the drawings, it is possible to provide for modifying the stabilization unit so as to adapt it to the treatment of trays of chicken eggs respecting a distribution of the egg receiving spots in staggered rows rather than a simple checkerboard distribution in lines and rows in two directions orthogonal with respect to one another. One appropriate solution to do this consists of equipping the transfer means for the eggs between the reservoir and the tray in progress with a mechanism able to convert the rectangular arrangement of the reservoir into an arrangement in staggered rows by shifting the cells by a half-pitch, periodically each time it is necessary. Performing this operation at the egg transfer device makes it possible to best satisfy an arrangement in staggered rows in terms of the structure of the equipment and operating safety.

The preceding shows that the invention is not limited to the embodiments specifically described or to the concrete embodiments illustrated in the figures. On the contrary, it extends to any alternative using equivalent means. Thus, situations exist where it may be possible to eliminate the presence of egg receiving cells physically embodied by their mobility on rails provided to that end in the reservoir. Assuming, for example, that while remaining in the food industry, the egg objects stored in individual cells in the trays are no longer chicken eggs, with their strict handling requirements, but fruits stored freely side by side, one behind the next in each column of the tray, it will be possible to use a reservoir including a set of individually retractable fingers controlled between a deployed position and a retracted position when necessary to grasp the objects available in each row in a number corresponding to the number of objects missing from the corresponding reservoir column, and push them until they are brought into position to be collectively grasped by the transfer device and deposited by that device in the place left free in each column behind the tray in progress.

The invention is also not limited to an implementation incorporating the stabilization unit with its reservoir and its associated control device in a production chain involving a candling unit for the eggs in a prior treatment step and/or a vaccine injection unit in a subsequent step, whether the operations specific to each of these steps are performed in the continuation of the stabilization step, before and after that step, respectively, in the same industrial facility, or relative to the stabilization step, they are postponed to a later time and/or implemented on remote geographical sites.

Although it is true that regarding egg trays when accepted for stabilization operations, egg trays that are not full enough most often follow a prior treatment done by nondestructive inspection of the condition of the individual eggs done by visiometry and leading to removing the eggs from each tray that are deemed non-valid by an automatic analysis of the information collected by visiometry, it is also true that upon leaving the stabilization unit, the trays that have been completely filled can be destined for many subsequent treatment operations other than vaccine injection. For example, one may consider the injection of a viral seed culture in applications using fertilized eggs as culture medium for vaccine production, or injection in the eggs of any treatment product to protect the chicks that will be born from the treated eggs, or the removal of a sample of the material inside each egg using a needle piercing the shell. These are scenarios where the industrial requirements are particularly strict regarding the filling state of each tray and the geometric regularity in terms of shape of individual eggs and arrangement of different eggs in their respective receiving spots.

The invention claimed is:

1. A system for processing eggs, the system comprising:
a conveyor configured to convey egg trays containing eggs along a path;
transfer means positioned along the path and configured to transfer eggs from the egg trays;
a plurality of egg receiving cells disposed proximate to the transfer means for receiving eggs removed from the egg trays, the egg receiving cells being mounted to be individually movable in an available egg reservoir; and
automatically controlling drive means configured to control movement of the egg receiving cells, the drive means having a control device configured to automatically determine a placement of the egg receiving cells to receive the removed eggs, wherein the control device is further configured to direct the drive means to concentrate the egg receiving cells of the egg reservoir by bringing them, alongside one another by rows of egg receiving cells, toward a storage zone of the egg reservoir such that a line of demarcation is formed between egg-bearing egg receiving cells and empty egg receiving cells, and further wherein said drive means include a comb with retractable teeth that is mounted movably along said rows of egg receiving cells from one of their ends to the other across all of said rows, the teeth of the comb each being assigned to one of said rows of egg receiving cells and individually controlled between an active position driving an egg receiving cell of the corresponding row with which it engages and an inactive position where it withdraws away from the egg receiving cells while the comb travels over all of the rows of egg receiving cells.

2. The system according to claim 1, wherein the transfer means comprise a suction plate having individual grasping means for grasping eggs that are distributed in as many lines and columns as each of said traveling egg trays has egg locations.

3. The system according to claim 1, wherein, in each of said rows, the egg receiving cells are mounted in series on a guide rail guiding their movements and in that, in each series, the egg receiving cells are alongside and against one another on said rail such that the egg receiving cells push one another along said rail when one of the egg receiving cells is commanded to move.

4. The system according to claim 1, wherein said comb comprises a support arm having a plurality of jack devices, each jack device bearing a finger forming one of said retractable teeth of said comb.

5. The system according to claim 1, wherein each movable egg receiving cell of the egg reservoir has a driving tab with which the corresponding comb tooth engages when it is deployed in the active position to move in one direction or the other along a guide rail of the egg receiving cells in series in the same row.

* * * * *